Nov. 1, 1960 — L. R. FOOTE — 2,958,814
CONTROL SYSTEM FOR ALTERNATING CURRENT MOTOR
Filed Aug. 29, 1958

Inventor:
Lawrence R. Foote,
by Irving H. Marshman
His Attorney.

United States Patent Office 2,958,814
Patented Nov. 1, 1960

2,958,814

CONTROL SYSTEM FOR ALTERNATING CURRENT MOTOR

Lawrence R. Foote, Roanoke, Va., assignor to General Electric Company, a corporation of New York Filed Aug. 29, 1958, Ser. No. 758,150

8 Claims. (Cl. 318—207)

This invention relates to control systems, more particularly to control systems for alternating current motors, and it has for an object the provision of a simple, reliable and improved control system of this character.

Another object of the invention is the provision of a static control system for effecting operation of an alternating current multi-phase motor at all torques between maximum motoring and maximum overhauling and at all speeds between maximum forward and maximum reverse while maintaining the multi-phase voltages and multi-phase currents substantially balanced.

A further object of the invention is the provision of a control system of the foregoing character which minimizes heating of the motor.

Still another object of the invention is the provision of a control system for an alternating current motor which utilizes only static switching devices for reversing the motor and which maintains the multi-phase voltages and currents approximately balanced during the reversing operation.

An additional and related object of the invention is the provision of a control system employing a minimum of apparatus components for varying the torque between maximum and minimum limits, and reversing it without significant unbalance of the multi-phase voltage supplied to the motor.

In carrying the invention into effect in one form thereof, the primary winding of a saturable transformer is connected between a first motor primary terminal and a first supply terminal, and its secondary winding is connected between a second motor primary terminal and a second supply terminal. Between the second supply terminal and a point on the primary winding of the transformer is connected an impedance device, and between the third motor terminal and the third supply terminal is connected a second impedance device. One of the impedance devices is a saturable reactor. The transformer and the reactor are provided with saturation control windings and means are provided for saturating the transformer and the reactor to effect rotation of the motor in one direction.

In another aspect of the invention which comprehends full reversing operation, both impedance devices are saturable reactors. A reversing master switch, in one of its operating positions, energizes the saturation control windings of the transformer and one of the reactors to effect operation of the motor in one direction and, in another of its operating positions energizes the saturating windings of both reactors to effect operation of the motor in the reverse direction.

Figure 1:
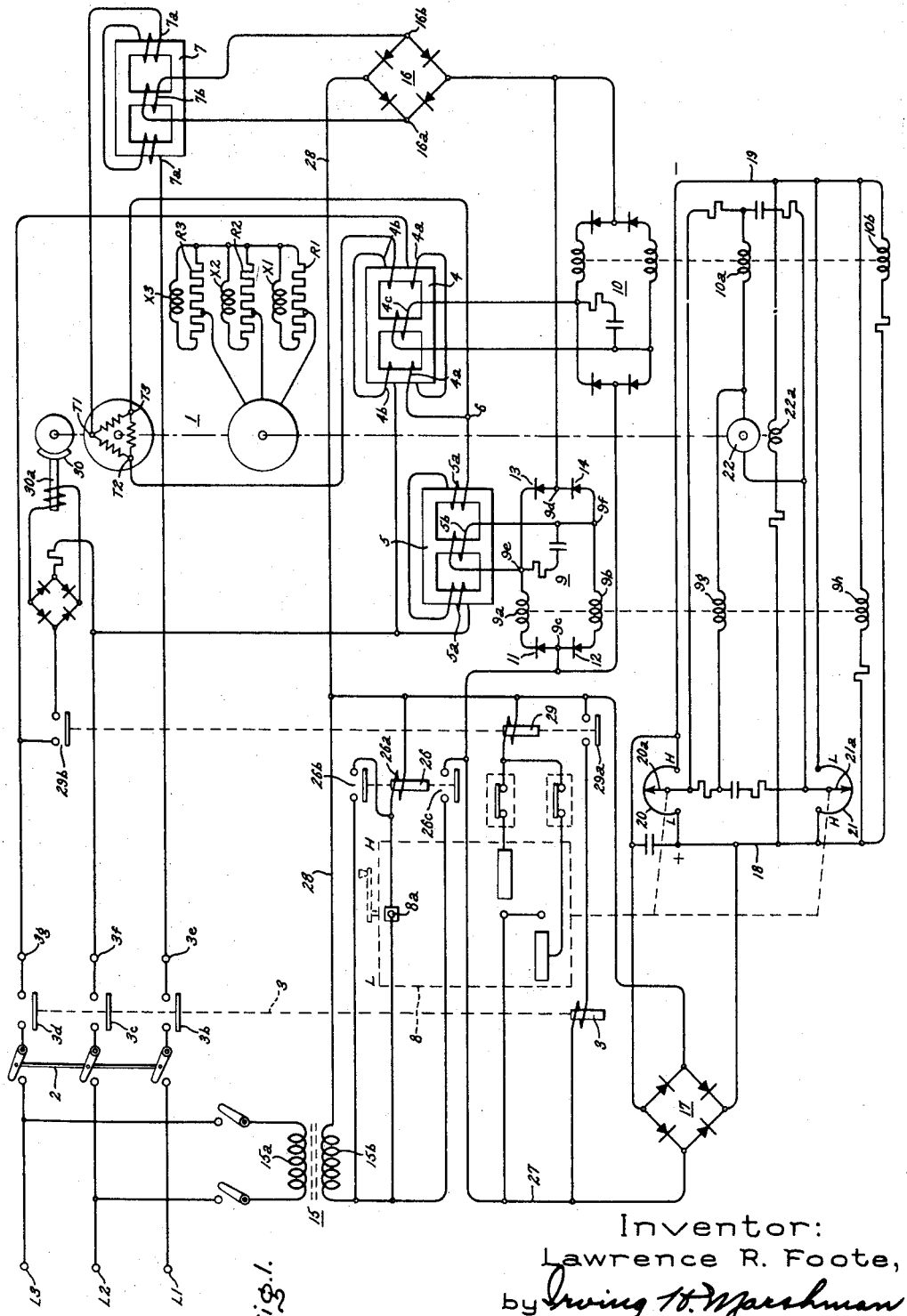
Figure 2:
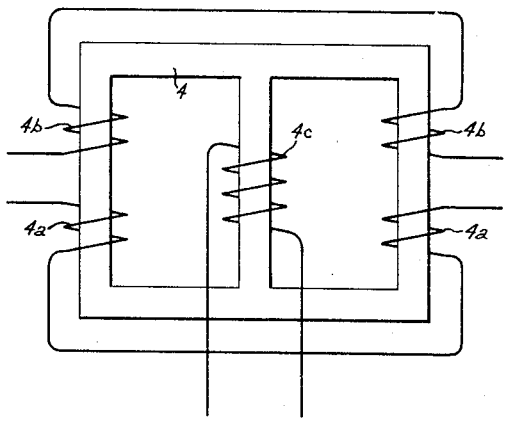
Figure 3:
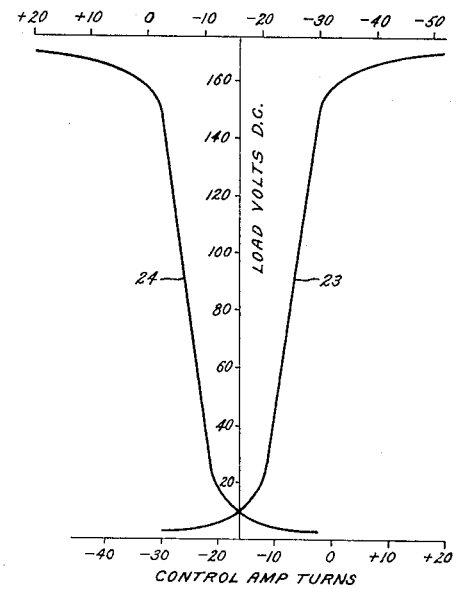
Figure 5:
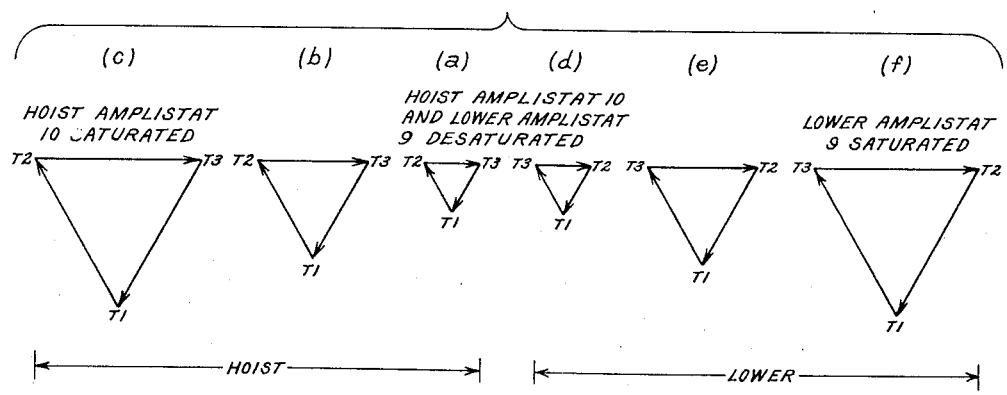
Figure 4:
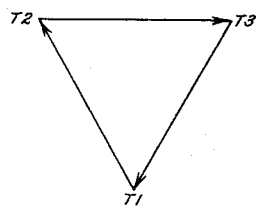
Figure 6:
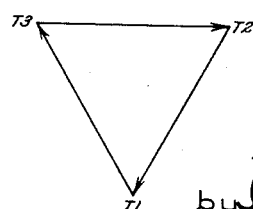

For a better and more complete understanding of the invention, reference should now be had to the following specification and to the accompanying drawings of which Fig. 1 is a simple, diagrammatical sketch of an embodiment of the invention, Fig. 2 is a sketch of a saturable transformer element of the invention, Fig. 3 is a chart of characteristic curves of a magnetic amplifier of the self-saturating or amplistat type which facilitates an understanding of the operation of the invention and Figs. 4, 5, and 6 are vector diagrams of the voltages supplied to the motor terminals under various operating conditions which also facilitate an understanding of the operation.

Referring now to the drawing, an A.-C. motor 1 which is illustrated as a wound rotor induction motor has three primary terminals T1, T2, and T3 for receiving three-phase voltage from the supply terminals L1, L2, and L3 when the line switch 2 and the line contactor 3 are closed. In the three phases of the secondary winding of the motor are connected suitable impedance means such as the parallel combinations of resistors and reactors R1—X1, R2—X2, and R3—X3.

Between the motor primary terminal T3 and the line contactor terminal 3g is connected the primary winding 4a of a saturable transformer 4 of which the secondary winding 4b is connected between the motor primary terminal T2 and the line contactor terminal 3f. The power winding 5a of a saturable reactor 5 is connected between the line contactor terminal 3f and a point 6 on the primary winding 4a. This point may, in some cases, be an intermediate point, and in other cases may be the terminal which is common to the motor terminal T3. The latter case is illustrated in the drawing. Between the motor primary terminal T1 and the line contactor terminal 3e is connected the power winding 7a of a second saturable reactor 7.

For the purpose of varying the impedances of its primary and secondary windings the saturable transformer is provided with a D.-C. saturation control winding 4c. Similarly, the saturable reactors 5 and 7 are provided with D.-C. saturation control windings 5b and 7b respectively. Preferably, the core member of the saturable transformer is a three-legged magnetic structure with the D.-C. saturation control winding 4c on the central leg and the primary and secondary windings 4a and 4b wound on the outside legs. Each of these windings may be divided into two coils, one on each of the outside legs.

For the purpose of controlling the speed and direction of rotation of the motor 1, a multi-position reversing type master switch 8 and directional magnetic amplifiers 9 and 10 are provided.

Although the magnetic amplifiers 9 and 10 may be of any suitable type, they are preferably of the self-saturating type illustrated in Fig. 1. They are generally known as amplistats. As shown, magnetic amplifier 9 comprises two load circuit or gate windings 9a and 9b which are connected in alternate rectified circuit portions of a bridge-type full wave rectifier which comprises four individual rectifiers 11, 12, 13, and 14. The input terminals 9c and 9d of the bridge are supplied from a suitable source of alternating voltage such for example as the secondary winding 15b of a supply transformer 15 of which the primary winding 15a is supplied from the line supply terminal L2 and L3. Across the output terminals 9e and 9f is connected the saturation control winding 5b of saturable reactor 5. The magnetic amplifier 10 is preferably of the same type as the magnetic amplifier 9 and is connected in parallel with it. Across its output terminals is connected the saturation control winding 4c of the saturable transformer 4. In one of the A.-C. supply connections between the amplistats 9 and 10 is connected a bridge-type full wave rectifier 16 across the output terminals 16a and 16b of which is connected the D.-C. saturation control winding 7b of saturable reactor 7. Thus the saturation control windings 7b, 4c and 5b are connected in a series parallel combination with winding 7b connected in series with the parallel combination of windings 5b and 4c.

For the purpose of controlling the saturation of its core member and thereby varying its output voltage, the amplistat 9 is provided with a main saturation control winding 9g and with a negative bias winding 9h. Similarly the amplistat 10 is provided with a main saturation control winding 10a and with a negative bias control winding 10b. The two main saturation control windings are connected in parallel with each other for energization by the difference between an adjustable reference voltage which is representative of the desired speed of the motor 1 and a control voltage which is representative of its actual speed.

A bridge-type full wave rectifier 17, having its input terminals supplied from the secondary winding 15b of the supply transformer, furnishes to the direct voltage supply conductors 18 and 19 a substantially constant direct voltage. From this direct voltage, the adjustable reference voltage is derived by suitable means such for example as the two rheostats 20 and 21 which are connected across the supply conductors 18 and 19 and which have their sliders 20a and 21a mechanically coupled to the operating handle of the master switch. The control voltage which is representative of the motor's actual speed is furnished by means of a tachometer generator 22 which is driven by the motor 1. It has a field winding 22a which is supplied from the D.-C. supply conductors 18 and 19. The two saturation control windings 9g and 10a of the amplistats are connected in parallel circuits between the slider 20a of rheostat 20 and one terminal of the tachometer generator, and the opposite terminal of the tachometer generator is connected to the slider 21a of rheostat 21.

The relationship between output volts and control ampere turns of amplistat 9 is illustrated in Fig. 3 by the curve 23 of which ordinates represent output volts and abscissae represent control ampere turns. Abscissae at the right of the zero axis are positive. As illustrated by curve 23, with zero control ampere turns the amplistat is substantially fully turned on, i.e. its output voltage is close to maximum. Consequently a negative bias which, for the purposes of illustration, is indicated as 16 ampere turns is required to reduce the output voltage to a minimum value. The output voltage input characteristic of amplistat 10 is represented by curve 24. This curve is substantially identical with curve 23. Consequently to aid in visualizing both curves positive abscissae of curve 24 are shown to the left of its zero ordinate, and negative abscissae to the right.

In the off position of the master switch both sliders 20a and 21a are in their central zero voltage positions on the rheostats 20 and 21, and the reference voltage applied to the main saturation control windings 9g and 10a is therefore zero. Both amplistats are biased substantially to cutoff by their negative biases.

With the foregoing understanding of the elements and their organization, the operation of the system will readily be understood from the following detailed description. Assuming that the motor 1 is the drive motor of a hoist, positions of the master switch 8 which effect operation in the up direction are designated as hoist positions and positions which effect operation in the down direction are designated lowering positions.

To place the system in readiness for operation, the line switch 2 is closed to energize the power supply connections as far as the terminals of line contactor 3. In the off position of the master switch an energizing circuit for the operating coil 26a of the undervoltage protection relay 26 is established, and the relay picks up and closes its contacts 26b to seal itself in around the normally closed contacts 8a of the master switch, and it also closes its contacts 26c to complete the energization of the A.-C. control supply conductors 27 and 28 from the secondary winding of the transformer 15. Since the line contactor 3 and the brake relay 29 are open, the brake operating solenoid 30a is deenergized and the brake 30 is set either by gravity or by means of a spring (not shown).

Operation in the hoist direction is initiated by moving the master switch to the first position hoist in which an energizing circuit for the operating coil of brake relay 29 is completed. In response to energization, the relay 29 picks up and closes its contacts 29a to complete an energizing circuit for the operating coil of the line contactor 3 which thereupon closes its main contacts 3b, 3c and 3d to complete the connections of the motor primary terminals T1, T2 and T3 to the supply through the saturable transformer 4 and saturable reactors 5 and 7. Relay 29 also closes its contacts 29b to energize the brake solenoid winding 30a to release the brake. Also in the first position hoist of the master switch the sliders 20a and 21a of the rheostats 20 and 21 are moved a corresponding amount in the hoist, i.e. clockwise direction, and as a result the saturation control winding 10a is energized in a direction to saturate the hoist amplistat 10, and the control winding 9g is energized in a direction to aid the negative bias winding 9h and thus to maintain the "lower" amplistat 9 desaturated.

Saturation of the hoist amplistat 10 turns it on to energize the D.-C. saturation control winding 4c of saturable transformer 4 and the D.-C. saturation control winding 7b of saturable reactor 7. This saturates the transformer and the reactor 7 and leaves reactor 5 desaturated. Consequently the primary and secondary windings of the transformer and the power winding 7a of reactor 7 present minimum impedance to the line voltage, and the power winding 5a of reactor 5 presents maximum impedance. The result is that the motor terminal T2 is effectively connected to supply conductor L2 and motor terminal T3 is effectively connected to L3 and, of course, terminal T1, owing to the saturation of reactor 7, is connected to L1. A vector diagram of the voltages applied to the motor terminals is illustrated in Fig. 4. Since the transformer and the reactor 7 are substantially equally saturated, the impedances in all three supply connections to the primary are substantially equal with the result that the three-phase voltages and current are substantially balanced as represented by the vector diagram.

In response to the application of voltage to its terminals, the motor accelerates in the hoisting direction and drives the tachometer generator 22 in a direction in which its voltage opposes the reference voltage derived from the rheostats by the sliders 20a and 21a. The tachometer generator voltage is proportional to and representative of the actual speed of the motor. As the motor accelerates, the difference between the reference voltage and tachometer generator voltage decreases with the result that the saturation of the hoist amplistat 9, the transformer 4 and saturable reactor 7 are decreased. The voltage applied to the motor terminals decreases correspondingly and likewise the rate of acceleration decreases. This continues until a balanced condition is established in which the error voltage i.e. the difference between the reference voltage and the tachometer voltage is just adequate to maintain a stable operating condition in which the motor speed is approximately proportional to the position of the master switch.

The vector diagram of the voltage received by the motor terminals T1, T2, and T3 during this balanced operating condition on the first point hoisting of the master switch is illustrated in Fig. 5a. It will be noted that the three-phase voltages are substantially balanced.

Movement of the master switch to successively higher speed hoisting position increases the reference voltage correspondingly. In each such higher speed position, the operation just described is repeated and a new balanced operating condition is established with the motor operating at a constant speed of which the magnitude is related to the position of the master switch. The magnitudes of the voltages received at the motor terminals for the stable operating conditions are established by the regulator and depend on the load. Fig. 5a shows these voltages for a light hoisting load; Figs. 5b and 5c shown them for progressively heavier hoisting loads. In these vector diagrams the lengths of the vectors represent the magnitudes of the voltages. It will be noted that the three-phase voltages are substantially balanced at all speeds which result from operation of the master switch to its various operating positions. They will also be balanced at all torques within the speed range.

If the speed voltage of the tachometer generator should exceed the reference voltage, as would be the case for example if the master switch were quickly returned from a high speed hoisting position to a low speed position the currents in the amplistat D.-C. saturation control windings 10a and 9g would reverse. This would first turn off the hoist amplistat 10 and desaturate the saturable transformer 4 and the saturable reactor 7 and subsequently turn on the lower amplistat 9 and saturate both reactors 5 and 7. As the transformer and reactor 7 desaturate, the primary and secondary windings of the transformer and the power winding of the reactor exhibit increased impedance with the result that the power supplied to the motor is correspondingly decreased. The increasing impedances of the primary and secondary windings of the transformer produce increased voltage drops across these windings in phase with the L2—L3 voltage, and the subsequent saturation of reactor 5 decreases the voltage drop across power winding 5a. As a result the motor terminal T3 becomes effectively connected to supply terminal L2, and terminal T2 becomes effectively connected to supply terminal L3. The hoist amplistat being turned off, the saturation control windings 5b and 7b are connected in series relationship and the same saturating current flows in each. Consequently, reactor 7 is saturated and motor terminal T1 is effectively reconnected to supply terminal L1. Thus, the motor terminals T1, T2 and T3 are effectively connected to supply terminals L1, L3 and L2 respectively, and the three-phase voltage vector sequence is reversed as illustrated by the vector diagram in Fig. 6. The result is that the motor is again across the line with the rotor still rotating in the hoist direction but with phases 2 and 3 reversed. This counter torque rotation produces a very vigorous braking action of the motor which rapidly reduces its speed. As the speed approaches the value corresponding to the lowered reference voltage, the currents in the amplistat saturation control windings 10a and 9g again reverse and once again the motor terminals T1, T2 and T3 are effectively connected to the supply terminals L1, L2 and L3 respectively which is the hoist phase sequence illustrated by the vector diagram in Fig. 4.

Lowering operation is effected by operation of the master switch to one of its lowering positions. This reverses the polarity of the reference voltage derived from the rheostats 20 and 21, and likewise reverses the polarities of the D.-C. saturation and control windings of the hoist and lower amplistats. As a result, both reactors 5 and 7 are saturated and the saturable transformer 4 is desaturated which has the effect of connecting motor terminals T1, T2 and T3 to the supply terminals for the three-phase voltage sequence represented by the vector diagram in Fig. 6. For progressively heavier motoring torque in the lower direction the vector diagrams of the voltages received at the motor terminals T1, T2 and T3 are illustrated in Fig. 5d, Fig. 5e, and Fig. 5f respectively.

Taken in sequence from left to right, the vector diagrams of Fig. 5 represent a progressive change from hoist amplistat 10 saturated and lower amplistat 9 desaturated, to hoist amplistat and lower amplistat desaturated, to lower amplistat saturated and hoist amplistat desaturated. This series of vector diagrams also illustrate graphically the phase sequences and magnitudes of the voltages supplied to the motor terminals for the stable operating conditions for full hoisting to full lowering torque.

The three-phase voltages and three-phase currents supplied to the motor in all hoist and lower positions of the master switch are approximately balanced so that single phasing of the motor and its attendant disadvantage of undue heating are avoided. It will also be noted that the control is stepless, reversing and static, and that the reversals of the motor from a forward torque balanced operating condition to a reverse torque balanced operating condition is accomplished by means of three saturable core devices and without any electromagnetic switching devices.

Although in accordance with the provisions of the patent statutes, this invention is described as embodied in the apparatus illustrated, and the principle of the invention has been described together with the best mode in which it is now contemplated applying that principle, it will be understood that the invention is not limited to the apparatus shown and described, since alterations and modifications will readily suggest themselves to persons skilled in the art without departing from the true spirit of the invention or from the scope of the annexed claims.

What I claim as new and desire to secure by Letters Patent of the United States is:

1. A motor control system comprising three-phase alternating voltage supply terminals, an alternating current motor having three-phase terminals for receiving three phase voltage from said supply terminals, a saturable transformer having a primary winding connected between one of said supply terminals and one of said motor terminals, a secondary winding connected between a second of said supply terminals and a second of said motor terminals and a D.-C. saturation control winding, a first impedance device connected between said second supply terminal and a point on said primary winding, a second impedance device connected between the third of said supply terminals and the third of said motor terminals, one of said impedance devices being a saturable reactor, and means for saturating said transformer and said saturable reactor to effect rotation of said motor in one direction.

2. A motor control system comprising three-phase alternating voltage supply terminals, an alternating current motor having three-phase terminals for receiving three-phase voltage from said supply terminals, a saturable transformer having a primary winding connected between one of said supply terminals and one of said motor terminals, and a secondary winding connected between a second of said supply terminals and a second of said motor terminals, a first saturable reactor having a reactance winding connected between said second supply terminal and a point on said primary winding, a second saturable reactor having a reactance winding connected between the third of said supply terminals and the third of said motor terminals, a master switch having forward and reverse operating positions and an off position in which said transformer and said reactors are desaturated and operable to one of said operating positions to saturate said transformer and the first of said reactors to effect rotation of said motor in one direction and operable to the other of said operating positions to saturate both of said reactors to effect rotation of said motor in the opposite direction.

3. A motor control system comprising three-phase alternating voltage supply terminals, an alternating current motor having three-phase terminals for receiving three-phase voltage from said supply terminals, a saturamotor terminals, and a secondary winding connected between one of said supply terminals and one of said motor treminals, and a secondary winding connected between a second of said supply terminals and a second of said motor terminals and provided with a D.-C. saturation control winding, a first saturable reactor having a reactance winding connected between said second supply terminal and a point on said primary winding and having a D.-C. saturation control winding, and a second saturable reactor having a reactance winding connected between the third of said supply terminals and the third of said motor terminals and provided with a D.-C. saturation control winding, and a reversing master switch having an off position and forward and reverse operating positions and operable from said off position to one of said operating positions to energize the saturation windings of said transformer and said first reactor to effect rotation of said motor in one direction and operable to the other of said operating positions for energizing the saturating windings of both said reactors to effect rotation of said motor in the opposite direction.

4. A motor control system comprising three-phase alternating voltage supply terminals, an alternating current motor having three-phase terminals for receiving three-phase voltage from said supply terminals, a saturable transformer having a primary winding connected between one of said supply terminals and one of said motor terminals, and a secondary winding connected between a second of said supply terminals and a second of said motor terminals, a first saturable reactor having a reactance winding connected between said second supply terminal and a point on said primary winding and a second saturable reactor having a reactance winding connected between the third of said supply terminals and the third of said motor terminals, said transformer and said reactors having individual D.-C. saturation control windings, a master switch having an off position and forward and reverse operating positions, a first magnetic amplifier controlled in response to movement of said master switch to one of said operating positions for saturating said transformer and the second of said reactors to effect rotation of said motor in one direction and a second magnetic amplifier controlled in response to movement of said master switch to the other of said operating positions for saturating both said reactors to effect rotation of said motor in the reverse direction.

5. The motor control system claimed in claim 1 characterized in that the point of connection of said first impedance device to the primary winding of the saturable transformer is intermediate the terminals of said primary winding.

6. A motor control system comprising three-phase alternating voltage supply terminals, an alternating current motor having three-phase terminals for receiving three-phase voltage from said supply terminals, a saturable transformer having a D.-C. saturation control winding, a primary winding connected between one of said supply terminals and one of said motor terminals, and a secondary winding connected between a second of said supply terminals and a second of said motor terminals, a first saturable reactor having a reactance winding connected between a second of said supply terminals and a second of said motor terminals and having a D.-C. saturation control winding, a second saturable reactor having a D.-C. saturation control winding and having a reactance winding connected between a third of said supply terminals and a third of said motor terminals, a series parallel combination network having the saturating windings of said transformer and first reactor connected in parallel arms and the saturation control winding of said second reactor connected in the series arm and a master switch having forward and reverse operating positions and operable to one of said operating positions to energize the saturating windings of said transformer and second reactor to effect balance phase operation of said motor in one direction and operable to the other of said operating positions to energize the saturating windings of said saturable reactors to effect balance phase operation of said motor in the reverse direction.

7. A motor control system comprising three-phase alternating voltage supply terminals, an alternating current motor having three-phase terminals for receiving three-phase voltage from said supply terminals, a saturable transformer having a primary winding connected between one of said supply terminals and one of said motor terminals, and a secondary winding connected between a second of said supply terminals and a second of said motor terminals, a first saturable reactor having a reactance winding connected between said second supply terminal and a point on said primary winding, a second saturable reactor having a reactance winding connected between the third of said supply terminals and the third of said motor terminals, a master switch having an off position and forward and reverse operating positions for establishing a reference voltage having a polarity representative of a desired direction of rotation of said motor and a magnitude representative of a desired speed, a tachometer generator driven by said motor for producing a control voltage representative of the actual speed of said motor, and means responsive to the difference of a reference voltage of one polarity and said control voltage for saturating said transformer and said first reactor to effect balanced phase operation of said motor in one direction and responsive to the difference of a reference voltage of opposite polarity, and said control voltage for saturating said reactors to effect balance phase rotation of said motor in the reverse direction.

8. A motor control system comprising three phase alternating voltage supply terminals, an alternating current motor having three phase-terminals for receiving three phase voltage from said supply terminals, a saturable transformer having a primary winding connected between one of said supply terminals and one of said motor terminals, a secondary winding connected between a second of said supply terminals and a second of said motor terminals and having a saturation control winding, an impedance device connected between said second supply terminal and a point on said primary winding, a saturable reactor having a reactance winding connected between the third of said supply terminals and the third of said motor terminals and provided with a saturation control winding, and means for simultaneously varying the excitation of both said saturation control windings to effect rotation of said motor in one direction.

References Cited in the file of this patent

UNITED STATES PATENTS

| 2,384,864 | Wickerham | Sept. 18, 1945 |
| 2,384,865 | Wickerham | Sept. 18, 1945 |
| 2,550,569 | Lamm et al. | Apr. 24, 1951 |
| 2,712,105 | Mathias | June 28, 1955 |
| 2,832,024 | Wickerham | Apr. 27, 1958 |